United States Patent [19]
Peller et al.

[11] 4,296,839
[45] Oct. 27, 1981

[54] STRUCTURALLY DAMPED BOLT

[75] Inventors: Robert C. Peller; Jack E. Dyer, both of San Diego, Calif.

[73] Assignee: General Dynamics Corporation, San Diego, Calif.

[21] Appl. No.: 79,237

[22] Filed: Sep. 26, 1979

[51] Int. Cl.³ ............................................. F16F 7/08
[52] U.S. Cl. ................................. 188/378; 267/141
[58] Field of Search ................. 188/1 B; 248/562; 267/9 B, 30, 136, 141

[56] References Cited
U.S. PATENT DOCUMENTS

| | | | |
|---|---|---|---|
| 3,415,470 | 12/1968 | Woodford et al. | 188/1 B X |
| 3,831,920 | 8/1974 | Meldrum et al. | 188/1 B X |
| 3,948,497 | 4/1976 | Lovitt et al. | 188/1 B X |
| 4,039,050 | 8/1977 | Bowling et al. | 188/1 B |

Primary Examiner—Duane A. Reger
Attorney, Agent, or Firm—John R. Duncan; Frank D. Gilliam

[57] ABSTRACT

A damping device comprising a first element in the form of a bolt whose central rod portion, as a spring, forms a primary load path between structural elements between which the damping device is mounted, with a damping element of viscoelastic material loaded in shear between a pair of sleeves and forming a secondary load path, in parallel, with the primary load path to damp vibrations in the structural members.

1 Claim, 3 Drawing Figures

STRUCTURALLY DAMPED BOLT

BACKGROUND OF THE INVENTION

This invention relates, in general, to devices for mounting structural elements together and for damping any vibration between these structural elements and relates, in particular, to a structurally damped bolt, as an axial load carrying member, with the desired load carrying capability in which a damping member is incorporated to produce the desired damping capability.

It is a primary object of this invention to provide an element of a structural system which has the required load carrying capability along with a much increased structural damping capability; such capability being in the order of ten percent or more of the coefficient of structural damping.

This invention is particularly useful for supporting, isolating, and damping mirrors having stringent optical performance requirements, where there are critical damping requirements, such as, in space structures, carbon optic mirrors, and other commercial applications such as diesel engine mounts, where the critical damping ratio needs to be higher than presently available and where size and bulk may be a problem.

Accordingly, it is still another object of this invention to provide a structural element as a basic building block for applications where size and bulk may be a problem and where a high damping ratio is required.

There are, of course, a number of prior art vibration damping devices, typical examples of which are shown in the U.S. Pat. to Inuzuka No. 4,121,813, to Jorn et al No. 4,007,924, to Hipsher No. 3,584,857, to Mendez No. 3,257,124, to Tiberghien No. 3,667,706, and to Peter No. 4,158,403. All of these patents are essentially bushings for impact absorbing and vibration damping between two bodies. None of these patents, however, are directed to a device as a basic building block of a structural system having an axial load carrying member with a damper in parallel arrangement therewith to produce a desired damping and load carrying capability.

Accordingly, it is still another object to this invention to improve the prior art damping devices and provide a structurally damped bolt with the required load carrying capability along with a much increased damping ability.

SUMMARY OF THE INVENTION

The invention which attains foregoing objects is a damping device comprising a bolt whose rod portion, acting as a spring, forms a primary load path between structural members to which the bolt is connected with a damper of shear loaded viscoelastic material forming a second load path in parallel with the primary load path to damp vibrations in the structural members. The ends of the rod are provided with bosses to which metallic sleeves are attached between which the viscoelastic material is sandwiched to shear load the material and thus take advantage of its high energy dissipation characteristics.

There is another advantage in the construction of the damping device of this invention, as will be clear from a more detailed description hereinafter, and that is the fact that, by having the damping element as a secondary load path, time dependent deflections of the device due to the creep of the viscoelastic material are precluded. Thus, the damping device can be used where precision mounting of structural elements is required.

Accordingly, still another object of this invention is to provide a mounting device with damping characteristics which can be used where critical relationships between structural elements is important.

BRIEF DESCRIPTION OF THE PREFERRED EMBODIMENT

Figure 1:
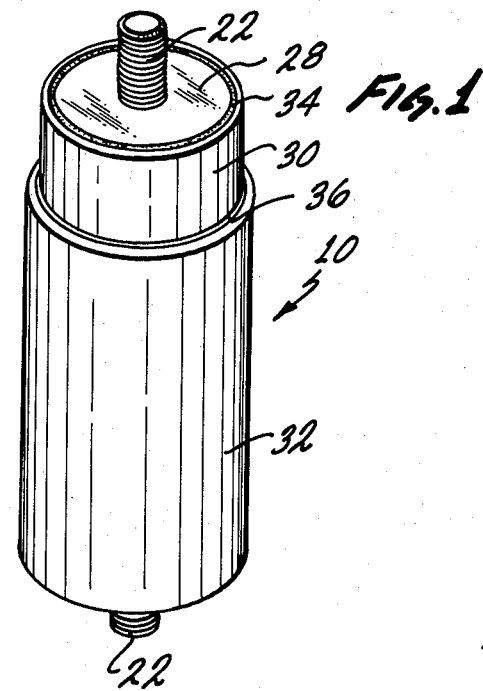
FIG. 1 is a perspective view of the damping device of this invention.
Figure 2:
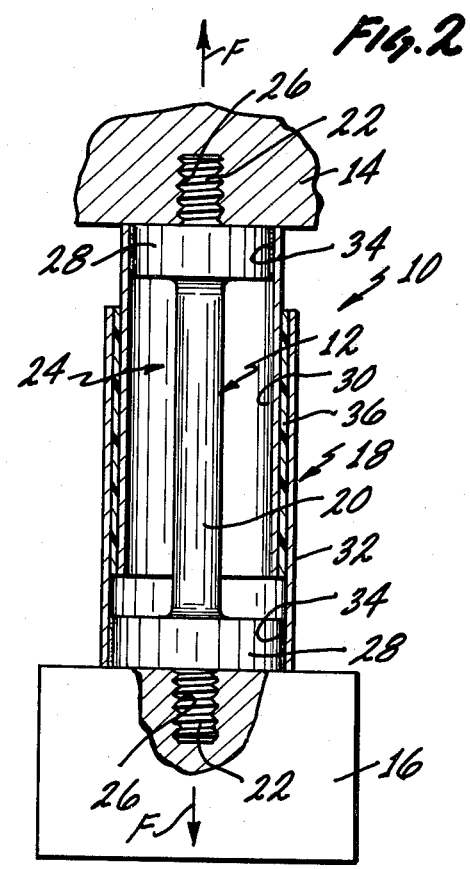
FIG. 2 is an elevational view, in cross-section, of the damping device of FIG. 1.
Figure 3:
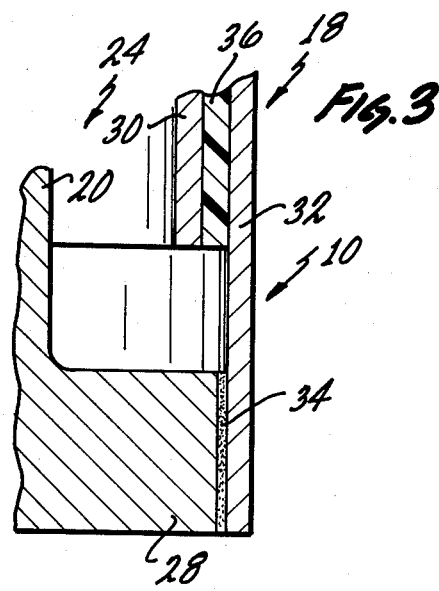
FIG. 3 is an enlarged view of a portion of the cross-sectional view of FIG. 2 to show the details of the device more clearly.

In the drawings there is disclosed a damping device 10, constructed in accordance with the teachings of this invention, and comprising a primary load path 12 to take the basic axial load, shown by the arrows F, between two structural elements 14 and 16 and a secondary load path 18 in parallel with the primary load path.

In the embodiment illustrated, the primary load path 12 is a central rod portion 20 and connecting ends 22 of a bolt, indicated in its entirety as 24, acting operationally as a spring. The ends 22 are connected in any suitable manner, as by threading, into threaded counter bores 26 in the structural elements 14 and 16. The bolt 24 is provided with end bosses 28 integrally formed between the central portion of the rod 20 and the ends 22.

The secondary load path 18, ie, the damping element of the device comprises relatively thin, cylindrical, metallic sleeves 30 and 32 attached to the pheriphery of the bosses 28 in any suitable manner, as by adhesive 34. These sleeves, each attached at one end only to one of the bosses, are arranged in overlapping parallel relationship separated a distance sufficient to allow a relatively thin viscoelastic damping material 36 to be placed between sleeves and attached to the surface of the sleeves facing the damping material in any suitable manner, as by adhesive, or the viscoelastic damping material could be a transfer adhesive itself. The length of the sleeves is less than the distance between the bosses with the viscoelastic material spanning the overlap between the sleeves to allow a shear to be transmitted to the viscoelastic material constrained between the sleeves due to the oppositely directed movement of the bosses and the sleeves when in operation.

The bolt 24 and sleeves can be manufactured from any basic structural material such as steel, aluminum, titanium, carbon, etc which normally have low coefficients of structural damping, while the viscoelastic material is selected for its damping qualities at a selected frequency and temperature range at which the damping device is to be operated.

While the foregoing disclosed structure appears rather simple, certain additional background material is incorporated herein concerning the invention.

As is known, damping requires not only energy storage but also energy dissipation. A good damper must not only be capable of storing large amounts of energy, but also capable of dissipating a large portion of this stored energy. Thus, a metal spring, a good energy storage device, is a poor damper because of its low energy dissipation characteristics.

Ordinary structural material, such as aluminum, steel, titanium, carbon, etc, have low coefficients of structural damping, usually less than one percent and, thus are considered poor dampers.

On the other hand, viscoelastic materials, having a high loss factor (its ability to dissipate stored energy), are frequently used to add damping to a structural system. Thus, a viscoelastic layer is conventionally added to a poor damping structure to form a composite structure having a damping factor higher than the original structure.

In this connection there are two types of damping treatments; extensional damping and shear damping.

Extensional damping treatments are characterized by free viscoelastic layers attached to the surface of a structure. Bending of the structure produces flexural and extensional energy storage in the viscoelastic layer. Shear has little effect on energy storage for free viscoelastic layers. It is found, however, that, for a free viscoelastic layer to be an effective damping treatment, its stiffness and thickness must be large relative to the structure being damped. Thus, weight and geometry limitations restrict the usefulness of free viscoelastic damping layers as damping treatments in systems requiring critical optical performance requirements.

Shear damping, on the other hand, are characterized by a viscoelastic layer attached to the basic structure (beam or sleeve 30 herein) with an elastic "constraining" layer (sleeve 32 herein) attached to the viscoelastic layer (layer 36 herein). Shear-strain energy storage tends to dominate the damping action of constrained viscoelastic layers. Thus, because of their high efficiency as energy dissipaters, constrained viscoelastic materials are excellent damping elements.

However, the damping efficiency of viscoelastic materials depend, not only on the inherent nature of the material, but also on the operating temperature and vibration frequency and since the viscoelastic material are selected according to their frequency characteristics and temperature characteristics, in the practical embodiment of the device constructed in accordance with the invention, a readily available 3 M viscoelastic tape, 3 M 468, which has a transition temperature near room temperature, was selected. This tape is supplied in a 5 mil thickness and is a transfer adhesive, like double sided "Scotch" tape.

Finally, still another factor, not solved in the shear damping in the prior art is the matter of creep deflections caused by the inherent properties of the viscoelastic material. Such time dependent creep characteristics prohibited the use of such materials in precision systems. Creep deflections simply could not be tolerated in critical dimension requirements. This is solved in the present invention by incorporating the viscoelastic material only as a secondary and parallel load path in the damping device, leaving the primary path capable of meeting the critical dimension (mounting) requirements of a system.

What is claimed is:

1. A structurally damped device for attenuating the vibrations between two structural members and having means for connecting said device to said structural members comprising:

means defining a first primary load path designed to take the basic load between said structural elements; and means defining a second structural load path in parallel with said primary load path;

said means for defining a primary load path is a spring comprising a bolt having end bosses integral therewith and wherein said means for defining a secondary load path comprises sleeves of material one attached to each of the end bosses and placed in overlapping relationship with viscoelastic damping material located between the sleeves and loaded in shear.

* * * * *